(12) United States Patent
Du et al.

(10) Patent No.: US 11,494,444 B2
(45) Date of Patent: *Nov. 8, 2022

(54) SYSTEMS AND METHODS FOR VISUALIZING AND ANALYZING MULTI-DIMENSIONAL DATA

(71) Applicant: Palantir Technologies Inc., Denver, CO (US)

(72) Inventors: Erica Du, Brooklyn, NY (US); George Price, Brooklyn, NY (US)

(73) Assignee: Palantir Technologies Inc., Denver, CO (US)

(*) Notice: Subject to any disclaimer, the term of this patent is extended or adjusted under 35 U.S.C. 154(b) by 0 days.

This patent is subject to a terminal disclaimer.

(21) Appl. No.: 17/180,548

(22) Filed: Feb. 19, 2021

(65) Prior Publication Data

US 2021/0173868 A1 Jun. 10, 2021

Related U.S. Application Data

(63) Continuation of application No. 16/138,455, filed on Sep. 21, 2018, now Pat. No. 10,929,476.

(60) Provisional application No. 62/598,699, filed on Dec. 14, 2017.

(51) Int. Cl.
| | |
|---|---|
| *G06F 3/04842* | (2022.01) |
| *G06F 16/904* | (2019.01) |
| *G06T 17/00* | (2006.01) |
| *G06F 3/01* | (2006.01) |
| *G06F 16/907* | (2019.01) |
| *G06F 3/04815* | (2022.01) |
| *G06F 3/04883* | (2022.01) |
| *G06F 40/169* | (2020.01) |

(52) U.S. Cl.
CPC ............ *G06F 16/904* (2019.01); *G06F 3/017* (2013.01); *G06F 3/04815* (2013.01); *G06F 3/04842* (2013.01); *G06F 3/04883* (2013.01); *G06F 16/907* (2019.01); *G06F 40/169* (2020.01); *G06T 17/00* (2013.01)

(58) Field of Classification Search
CPC ...... G06F 16/904; G06F 16/907; G06F 3/017; G06F 3/04815; G06F 3/04842; G06F 3/04883; G06F 40/169; G06T 17/00
See application file for complete search history.

(56) References Cited

U.S. PATENT DOCUMENTS 9,465,891 B1 * 10/2016 Kagan ................... G06T 11/206
10,929,476 B2 2/2021 Du et al.

\* cited by examiner

*Primary Examiner* — Dino Kujundzic
(74) *Attorney, Agent, or Firm* — Knobbe, Martens, Olson & Bear LLP

(57) ABSTRACT

A computer-implemented software system and method allows data-processing entities to visualize data as pseudo-three-dimensional objects dynamically and interact with and/or manipulate the objects.

20 Claims, 11 Drawing Sheets

SYSTEMS AND METHODS FOR VISUALIZING AND ANALYZING MULTI-DIMENSIONAL DATA

INCORPORATION BY REFERENCE

This application is a continuation of U.S. patent application Ser. No. 16/138,455, filed on Sep. 21, 2018, which claims the benefit of U.S. Provisional Patent Application No. 62/598,699, filed Dec. 14, 2017, which is incorporated by reference in its entirety. In addition, the following utility patents, utility patent applications, and provisional patent applications, including their written descriptions, claims, and drawings, are incorporated by reference in their entirety: U.S. Provisional Patent Application No. 62/171,875, filed Jun. 5, 2015; U.S. patent application Ser. No. 15/171,494, filed Jun. 2, 2016, issued as U.S. Pat. No. 9,672,257 on Jun. 6, 2017; and U.S. patent application Ser. No. 15/226,675, filed Aug. 2, 2016, issued as U.S. Pat. No. 9,753,935 on Sep. 5, 2017.

BACKGROUND

Field

This disclosure relates to systems and methods for data processing involving visualization and analysis of multi-dimensional data via an interactive user interface.

Description of the Related Art

Data-processing entities currently use multiple diverse computer-implemented software tools to visualize data. A need remains for a computer-implemented software tool that allows data-processing entities to visualize data as pseudo-three-dimensional (pseudo-3D) objects dynamically and interact with and/or manipulate the objects.

SUMMARY

The systems, methods, and devices described herein each have several aspects, no single one of which is solely responsible for its desirable attributes. Without limiting the scope of this disclosure, several non-limiting features will now be discussed briefly.

Systems and/or computer systems are disclosed that comprise a computer readable storage medium having program instructions embodied thereon, and one or more processors configured to execute the program instructions to cause the one or more processors to perform operations comprising one or more aspects of the above- and/or below-described embodiments (including one or more aspects of the appended claims).

Computer-implemented methods are disclosed in which, by one or more processors executing program instructions, one or more aspects of the above- and/or below-described embodiments (including one or more aspects of the appended claims) are implemented and/or performed.

And computer program products comprising a computer readable storage medium are disclosed, wherein the computer readable storage medium has program instructions embodied thereon the program instructions executable by one or more processors to cause the one or more processors to perform operations comprising one or more aspects of the above- and/or below-described embodiments (including one or more aspects of the appended claims).

DETAILED DESCRIPTION

Overview

Figure 1:
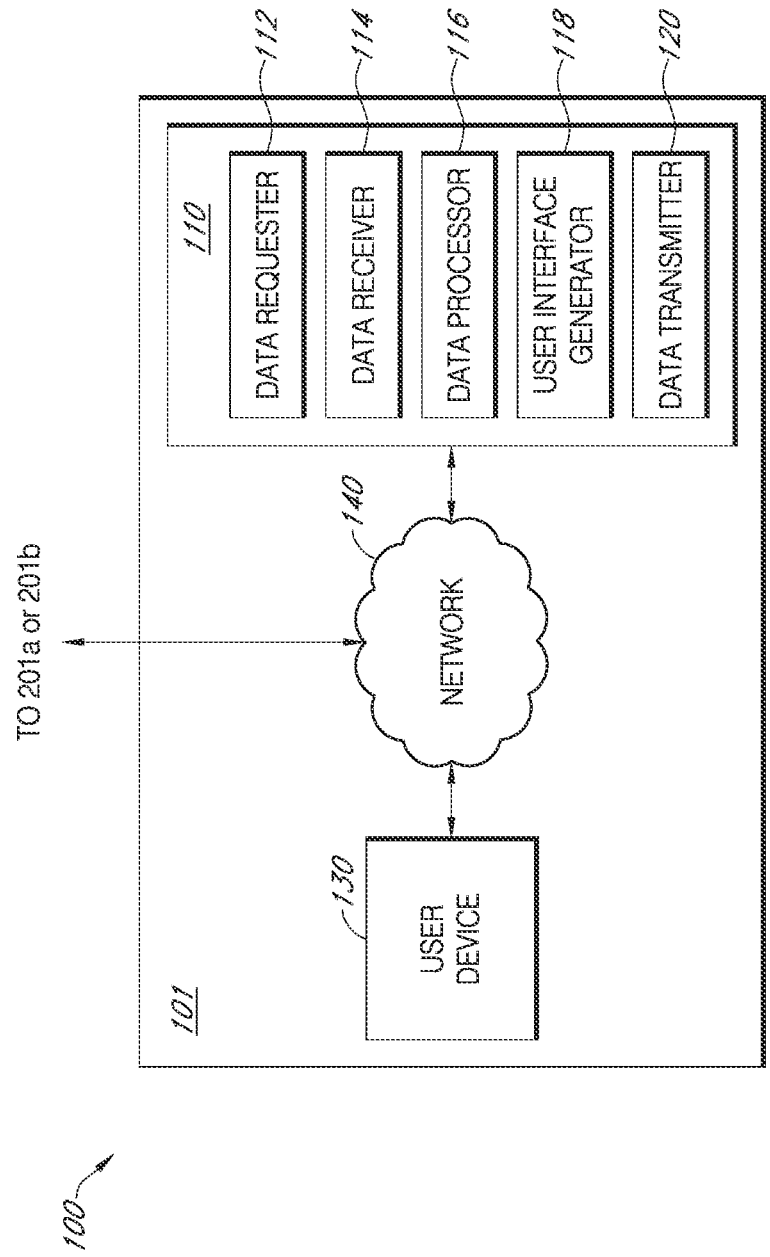
FIG. 1 is a block diagram showing various components of a presentation or front-end layer of a computing system according to at least one embodiment.

As noted above, a need exists for computer-implemented systems and methods that allow data-processing entities to visualize data as pseudo-3D objects dynamically and interact with and/or manipulate the objects. This disclosure addresses that need and describes systems and methods for data processing involving visualization and analysis of multi-dimensional data via an interactive user interface.

These systems and methods process database information involving series data and perform associated data processing involving display and analysis of the series data via an interactive user interface (UI). The series data can be, for example, time series data representing a series of data points sequenced in time order and/or sensor data representing a series of data points obtained from a sensor or sensors. Also disclosed herein are various systems and methods for displaying series data in an interactive UI and that allow a user to dynamically select, adjust, and/or analyze the data to identify patterns of interest. Embodiments may also involve selecting, obtaining, and analyzing or enhancing series data and performing processing in real time.

Definitions

In order to facilitate an understanding of the systems and methods discussed herein, a number of terms are defined below. These terms, as well as other terms used herein, should be construed to include the provided definitions, the ordinary and customary meaning of the terms, and/or any other implied meaning for the respective terms. Thus, the definitions below do not limit the meaning of these terms, but only provide exemplary definitions.

Database: Any data structure (and/or combinations of multiple data structures) for storing and/or organizing data, including, but not limited to, relational databases (e.g., Oracle databases, mySQL databases, etc.), non-relational databases (e.g., NoSQL databases, etc.), in-memory databases, spreadsheets, as comma separated values (CSV) files, eXtensible markup language (XML) files, TeXT (TXT) files, flat files, spreadsheet files, and/or any other widely used or proprietary format for data storage. Databases are typically stored in one or more data stores. Accordingly, each database referred to herein (e.g., in the description herein and/or the figures of the present application) is to be understood as being stored in one or more data stores. A "file system" may control how data is stored and/or retrieved (for example, a disk file system like FAT, NTFS, optical discs, etc., a flash file system, a tape file system, a database file system, a transactional file system, a network file system, etc.). For simplicity, the disclosure is described herein with respect to databases. However, the systems and techniques disclosed herein may be implemented with file systems or a combination of databases and file systems.

Data Store: Any computer readable storage medium and/or device (or collection of data storage mediums and/or devices). Examples of data stores include, but are not limited to, optical disks (e.g., CD-ROM, DVD-ROM, etc.), magnetic disks (e.g., hard disks, floppy disks, etc.), memory circuits (e.g., solid state drives, random-access memory (RAM), etc.), and/or the like. Another example of a data store is a hosted storage environment that includes a collection of physical data storage devices that may be remotely accessible and may be rapidly provisioned as needed (commonly referred to as "cloud" storage).

Data Series: Broadly, a data series includes a grouping of related information. An example of a data series is a time series. A time series can represent a sequence of data in time order.

Metadata: Broadly, metadata includes a set of data that describes, gives information about, or otherwise relates to other data.

Pseudo-three-dimensional or pseudo-3D object: A two-dimensional medium, such as a television screen, computer monitor, or tablet computer, cannot display objects in three dimensions. Three-dimensional projection or 3D projection is a method of mapping three-dimensional points to a two-dimensional plane to create a mapped object, such that a user viewing the mapped object perceives the mapped object as representing three-dimensional data, even when it is displayed in two dimensions. Orthographic projection, weak perspective projection, and perspective projections are example methods for 3D projection. As used here, a "pseudo-three-dimensional object" or "pseudo-3D object" broadly refers to an object representing data in at least three dimensions, configured for display on a two-dimensional plane. Two-dimensional planes include planes embodied by curved screens or displays, such as curved monitors and curved televisions.

Select: Broadly, selecting includes choosing something in preference to another or others. The definition of selecting is not limited to selections by a user, but can also include selections by a computer in the course of executing a function.

Real time: Broadly, "real time" takes refers to processing, operating, or otherwise acting without any intentional delay. The term real time takes into account the limitations of the implementing computer system and the time required to process data.

Example Presentation Or Front-End Layer Configuration

In at least on embodiment, a computing system is configured to process series data and provide interactive functionality enabling users to visualize, interact with, and/or manipulate the series data via an interactive UI may be provided. The following description relates to an example presentation layer of such a computing system that allows data-processing entities to visualize data as pseudo-3D objects dynamically and interact with and/or manipulate the objects.

FIG. 1 illustrates a block diagram showing various components of the presentation or front-end (FE) layer 101 of computing system 100. As shown in FIG. 1, the FE layer 101 may include any or all of the following: a front-end (FE) server 110, a user device 130, and a network 140. The FE layer 101 communicates with back-end layer 201 of computing system 100, discussed in greater detail with respect to FIGS. 2A and 2B. In some embodiments, FE layer 101 and/or user device 130 communicate with the FE server 110 via the network 140. In other embodiments, some or all of the foregoing components can be combined into a single computing system, such as a server or series of servers. Similarly, the functionality of any or all of the foregoing components may be distributed to other computing devices and/or partially performed by multiple computing devices. In some embodiments, one or more local processing devices can perform some or all of the processing performed via the components shown to be remote or in the cloud.

The FE server 110 can include various modules. For example, the FE server 110 can include one, some, or all of the following modules: a data requester 112, a data receiver 114, a data processor 116, a user interface generator 118, and a data transmitter 120. In at least one embodiment, the data requester 112, the data processor 114, and the user interface generator 116 are implemented as executable code modules that are stored in the memory of, and executed by the CPU(s) of, the FE server 110. The data requester 112, the data processor 114, and the user interface generator 116 can also be implemented partly or wholly in application-specific hardware.

The data requester 112 can receive a request for data from the user device 130 and format the request for data for transmission to the BE layer 201. The data requester can process the request for data from the user device 130 as more than one requests for data from the BE layer 201. For example, when the request for data from the user device relates to multi-dimensional data, and the BE layer 201 stores the multi-dimensional data as separate data sets (as shown, for example in FIG. 2A), the requests for data from the BE layer 201 can include a first request for data (such as data in the X direction vs. time), a second request for data (such as data in the Y direction vs. time), a third request for data (such as data in Z direction vs. time), a fourth request for data (such as temperature vs. time), a fifth request for data (such as metadata associated with X-direction, Y-direction, and Z-direction data), and so forth. If the BE layer 201 is configured to store multi-dimensional data in a single data set, however (as shown, for example, in FIG. 2B), the request for data from the BE layer 201 can comprise a single request for data.

The data receiver 114 can receive data (including any requested metadata) from the BE layer 201. In certain embodiments, the data receiver 114 can perform additional processing or formatting of the data, as needed.

When data is received by the data receiver 114 as separate data sets in response to separate requests for data, the data processor 116 can stitch some or all of the retrieved data series together, if desired. In at least one embodiment, each received data set can be downsampled prior to stitching. Here, downsampling generally refers to reducing the number of data points in the data set. Downsampling is not a necessary step. Downsampling can, however, advantageously increase computing speed in stitching the data together and ultimately rendering the data for display. Downsampling can also advantageously improve the aesthetic of rendered data by providing for a smoother data set. Downsampling can include retrieving fewer than all data points in a data set or retrieving all data points in a data set and discarding some of the data points prior to rendering.

Data stitching can also include alignment of the data sets. In this regard, the data processor 116 can arrange the data sets (optionally downsampled) such that the data sets are relatively close to their actual aligned positions or in their aligned positions and return the stitched-together data as a single data set. Continuing the prior example, the data processor 116 can arrange the X position, Y position, Z position, and temperature data sets based on similarities in their associated times. In alternative embodiments, a stitched-together data set can be downsampled after stitching, instead of prior to stitching. In embodiments in which data is received by the data receiver 114 as a single data set in response to a single request for data, data stitching may not be required.

The user interface generator 118 can generate an interactive user interface using a data set from the data receiver 114 and/or the data processor 116. For example, the user interface generator 118 can generate a plurality of pseudo-3D graphs using real time 3D rendering. Example user interface functionality is discussed in greater detail below with respect to FIGS. 3A-3G. Preferably, the user interface generator 118 can generate the interactive user interface for display on an Internet web browser. In this regard, in an example implementation, the user interface generator 118 can be programmed with TypeScript, incorporating functionality of Javascript libraries such as Three.js (a JavaScript library for creating and displaying pseudo-3D computer graphics in a web browser) and React.js (a JavaScript library for building interactive user interfaces), compiled to a platform-independent JavaScript application suitable for use with an Internet web browser. Additional functionality for real time rendering, particularly based on processing of content updates, is disclosed in U.S. Provisional Patent Application No. 62/507,993 and U.S. patent application Ser. No. 15/672,062, each of which were incorporated by reference above.

The user interface generator 118 can be configured to include additional features in the interactive user interface. Preferably, the user device 130 is configured with an input device that allows the user device to receive gesture events. Gesture events include, for example, finger or button down events, finger or button up events, finger or button taps, mouse clicks, mouse wheel scrolls, scroll bar manipulations, menu selections, mouseovers, and so forth. Preferably, the user interface generator 118 is configured to update the interactive user interface in response to gesture events. In addition, the user device 130 may receive requests for updated or new series data and transmit such requests to the FE server 110. The requests may be generated in response to the manipulation of the interactive user interface by a user. Manipulations may include panning, scrolling, zooming, selecting an option to modify, combine and/or aggregate one or more data sets to produce a new data set, and/or the like. For example, the user may be viewing, via the interactive user interface, a graphical representation or object associated the X, Y, and Z values of a component at a point in time. The user may then select an option to view a graphical representation or object associated with the X, Y, and Z values of the component at another point in time. Selection of this option may cause the user device 130 to generate a computational expression that identifies the first time-series data set, the second time-series data set, and an arithmetic operation (for example, addition). The user interface generator 118 receives the computational expression and updates the interactive user interface to reflect the user's selection. Additional features of the interactive user interface provided by or in conjunction with the user interface generator 118 are described in greater detail in more detail in U.S. Provisional Patent Application No. 62/273,336 and U.S. Provisional Patent Application No. 62/348,119, incorporated by reference above.

In at least one embodiment, the user interface generator 118 is configured to update the interactive user interface to display metadata associated with a pseudo-3D object. For example, the user may be viewing, via the interactive user interface, a graphical representation or object associated with the X, Y, and Z values of a component at a point in time. When a user hovers or clicks on or otherwise makes a gesture indicating a unique X, Y, and Z space on the graphical representation or object, a representation of a temperature associated with the unique X, Y, and Z space can be figured to display on or adjacent to the user's indication.

The optional data transmitter 120 can receive requests to update a data set (or a data series within a data set) in response user input from the user device 130 and transmit a responsive expression to the BE layer 201 to update the relevant data set or data series. For example, the user may enter textual data to annotate a particular X, Y, and Z position at a particular time as showing a point of interest. The data transmitter 120 can receive the textual data from the user device 130 and generate a responsive expression providing instructions for the BE layer 201 to update or create metadata associated with that position and time. The data transmitter 120 can then pass the expression to the BE layer 201. In another example, the user may enter textual or other input data at the user device 130 overriding a data point displayed on the interactive user interface to correct or delete erroneous information from an errant sensor reading. The data transmitter 120 can receive the input data and generate a responsive expression providing instructions for the BE layer 201 to update the data series or data set associated with that data point. The data transmitter 120 can then pass the expression to the BE layer 201.

The FE server 110 may be implemented as a special-purpose computer system having logical elements. In an embodiment, the logical elements may comprise program instructions recorded on one or more machine-readable storage media. Alternatively, the logical elements may be implemented in hardware, firmware, or a combination thereof. In one embodiment, the FE server 110 may be implemented in a Java Virtual Machine (JVM) that is executing in a distributed or non-distributed computer system. In other embodiments, the FE server 110 may be implemented as a combination of programming instructions written in any programming language (e.g. C++, Visual Basic, Python, etc.) and hardware components (e.g., memory, CPU time) that have been allocated for executing the program instructions.

As discussed above, a user can use the user device 130 to view and interact with the interactive user interface generated by the user interface generator 118. In certain embodiments, the user device 130 can be in communication with the FE server 110 and/or the BE layer 201 via a network 140. The user device 130 can include a variety of computing devices, including personal computing devices, terminal computing devices, laptop computing devices, tablet computing devices, electronic reader devices, mobile devices (e.g., mobile phones, media players, handheld gaming devices, etc.), wearable devices with network access and program execution capabilities (e.g., "smart watches" or "smart eyewear"), wireless devices, set-top boxes, gaming consoles, entertainment systems, televisions with network access and program execution capabilities (e.g., "smart TVs"), and various other electronic devices and appliances.

Preferably, the user device 130 can execute an Internet browser application to display the interactive user interface.

The network 140 can include a communications network, such as the Internet. The network 140 can be a wired network, a wireless network, or a combination of the two. For example, network 120 can be a local area network (LAN) and/or a wireless area network (WAN). The network 140 can include cables and/or other equipment that allow the transport of data. The network 140 can include one or more firewalls and/or an endpoint server, such as a secure HTTP endpoint system.

Additional features of a suitable FE layer 101 configuration that may not be specifically discussed above but are contemplated within the scope of this disclosure are described in U.S. Provisional Patent Application No. 62/171,875, U.S. patent application Ser. No. 15/171,494, and U.S. Pat. No. 9,672,257, all of which were incorporated by reference above in their entirety.

Example Data Access or Back-End Layer Configuration

Figure 2A:
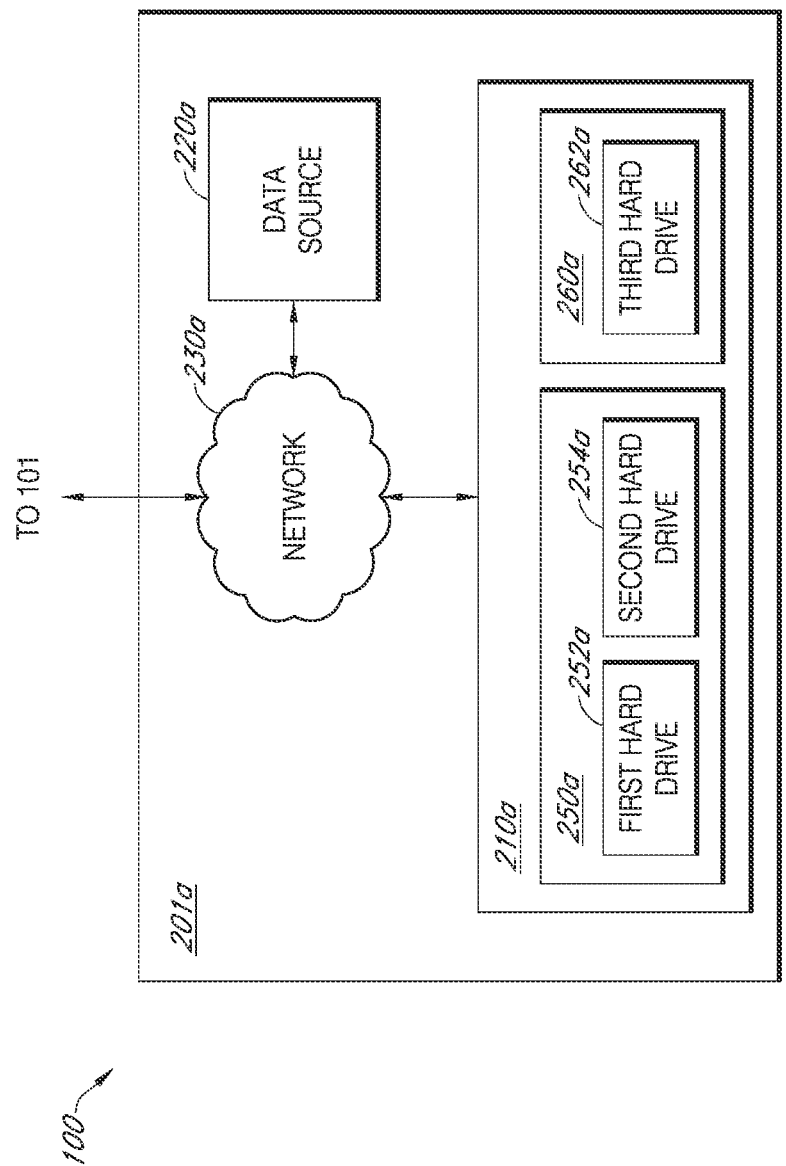
FIGS. 2A and 2B are block diagrams showing various components of data access of back-end layers of computer systems according to various embodiments.

FIG. 2A illustrates a block diagram showing various components of an example data access or back-end (BE) layer 201a of computing system 100. As shown in FIG. 2A, the BE layer 201a may include any or all of the following: a back-end (BE) server 210a, a data source 220a, and a network 230a.

The BE server 210a receives requests for data from the FE server 110 of FIG. 1 and forwards aspects of such requests to the other components of the BE layer 201a and, in turn, returns data responsive to the requests to the FE server 110 of FIG. 1. The BE server 210a may also receive updated data and/or new data from the FE server 110 and update or store the data in the other components of the system BE layer 201a, as appropriate.

The BE server 210a may be implemented as a special-purpose computer system having logical elements. In an embodiment, the logical elements may comprise program instructions recorded on one or more machine-readable storage media. Alternatively, the logical elements may be implemented in hardware, firmware, or a combination thereof. In one embodiment, the BE server 210a may be implemented in a Java Virtual Machine (JVM) that is executing in a distributed or non-distributed computer system. In other embodiments, the BE server 210a may be implemented as a combination of programming instructions written in any programming language (e.g. C++, Visual Basic, Python, etc.) and hardware components (e.g., memory, CPU time) that have been allocated for executing the program instructions.

The data source 220a can be a computing or mechanical device that can determine, measure, and/or capture data values, such as time-series data. For example, the data source 220a can be a sensor or plurality of sensors for measuring physical parameters, a financial system, a medical electronic records system, and/or the like. Additional disclosure of sensors as data sources that provide series data to be stored in and accessed from a data store is shown, for example, in FIGS. 1A, 1B, 2A, and 2B in U.S. Pat. No. 9,672,257, incorporated by reference above. Examples of organization and uses of series data is also discussed at least with respect to FIGS. 1A, 1B, 2A-2C, 3A, 3B, 4A-4C, and 5A-5D in U.S. Pat. No. 9,753,935, incorporated by reference above. And while FIG. 2A illustrates a single data source 220a, this is not meant to be limiting. The BE layer 201a can include multiple data sources 220a. Likewise, the BE layer 201a need not include any data source.

The data source 220a can transmit determined, measured, and/or captured data to the data store 230a. In an embodiment, the data source 220a and the data store 230a communicate via a network 240a.

The network 240a can include any communications network, such as the Internet. The network 240a may be a wired network, a wireless network, or a combination of the two. For example, network 240a may be a local area network (LAN) and/or a wireless area network (WAN).

In the embodiment of FIG. 2A, BE server 210a includes first database 250a and second database 260a. First database 250a includes a first hard drive 252a and a second hard drive 254a. This configuration can be advantageous because it allows for implementation of a distributed or redundant data storage scheme among a plurality of hard drives. For example, data from one sensor can be stored on the first hard drive 252a while data from a second sensor can be stored on the second hard drive 254a. As a different example, sensor data can be spread across multiple hard drives 252a, 254a so that it can be more quickly read in parallel.

Further in the embodiment of FIG. 2A, second database 260a includes a third hard drive 262a. In this example configuration, the third hard drive 262a can store metadata about the data in the first database 250a. The metadata can include any type of information that is constant across a data collection event, or at least constant within portions of the data collection event. For example, the metadata can identify which sensor collected the data, what type of data was collected by the sensor, variables or conditions relating to the data collection event (including, but not limited to, properties about a device generating the sensed data, including its configuration, its materials, its layout, its shape, etc.), and so forth. The metadata can also include identification and storage information. For example, the metadata can include a unique identifier of the data and information about the location of the data in the first database 250a, such as which hard drive(s) 252a, 254a the series data is stored on, a physical address or virtual address indicating the storage location of the series data, etc. Additional metadata can also include a data collection event number, a data collection event location, a time that the data collection event was performed, an operator who executed the data collection event, and other information about the data collection event during which the sensor data was collected. In some embodiments, the additional metadata can be extracted from header information in the data, manually entered, retrieved from another database, or otherwise received or determined. The metadata can be received when the data is provided to BE server 210a or at any time before or after an analysis is performed. In some embodiments, second database 260a is a PostgreSQL database.

Although FIG. 2A illustrates an example embodiment in which the series data and metadata are stored on three hard drives, in various embodiments, the series data and the metadata can be stored on more or fewer hard drives. For example, in some embodiments, all data and metadata can be included on the same hard drive. In some embodiments, first database 250a can span over eight or sixteen hard drives. In some embodiments, the metadata can span multiple hard drives instead of one hard drive 262a as shown. In some embodiments one or more hard drives can be used for both databases and store both metadata and sensor data. In some embodiments, the hard drives 252a, 254a, 262a include a plurality of hard drives configured as part of a distributed and/or redundant data management scheme (and/or a "cloud" database).

It should also be understood that certain components or functions of FE layer 101 can be incorporated in BE layer 201a, and that certain components or functions of BE layer 201a can be incorporated by FE layer 101, and such variations represent embodiments of this disclosure.

Additional features of a suitable data access or BE layer 201a configuration that may not be specifically discussed above but are contemplated within the scope of this disclosure are described in U.S. Provisional Patent Application No. 62/171,875, U.S. patent application Ser. No. 15/171,494, and U.S. Pat. No. 9,672,257, all of which were incorporated by reference above in their entirety.

Example Data Access Layer Configuration

Figure 2B:
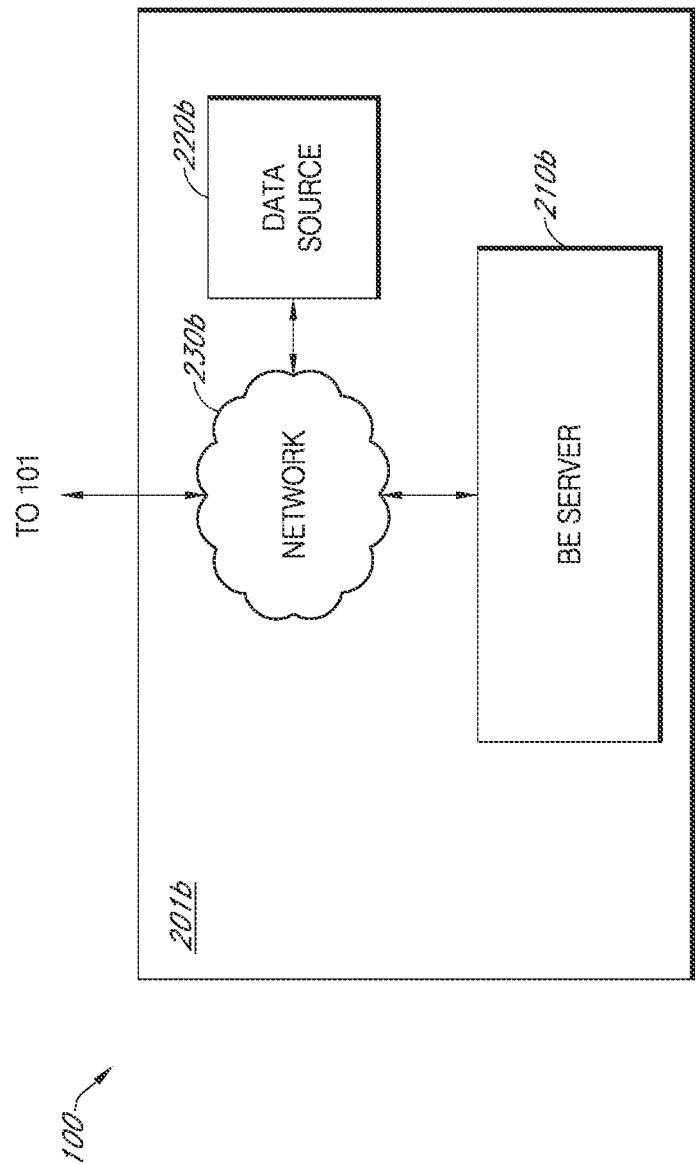

FIG. 2B illustrates a block diagram showing various components of an alternative embodiment of a data access or BE layer 201b of computing system 100. The system 100 can include a back-end (BE) server 210b, a data source 220b, and a network 230b. Like the BE server 210a of FIG. 2A, the BE server 210b of FIG. 2B receives requests for data from the FE server 110 of FIG. 1 and forwards aspects of such requests to the other components of the BE layer 201b and, in turn, returns data responsive to the requests to the FE server 110 of FIG. 1. The BE server 210a may also receive updated data and/or new data from the FE server 110 and update or store the data in the other components of the system BE layer 201b, as appropriate. Other example implementations for data and metadata storage and retrieval are structured as described in U.S. patent application Ser. No. 15/226,675 and U.S. Pat. No. 9,753,935, incorporated above by reference.

A difference between the BE layer 201a of FIG. 2A and the BE layer 201b is how data is stored. The embodiment of FIG. 2A generally shows a big data-key value store model. A key can be, for example, a series identifier associated with data such as a timestamp and a value. In an example embodiment, spatial data for a structure can include a series identifier, with an X-component data series and a Y-component data series. When the FE layer 101 makes a request to the BE layer 201a to get 3D data, the FE layer 101 can make two requests: one for the X-component data associated with the series identifier, and one for the Y-component data associated with the series identifier. After receiving the X-component data and the Y-component data, the FE layer 101 (or the BE layer 201b, depending on the embodiment) can stitch the received data together and for rendering by the user interface generator 118 of FIG. 1, assuming a constant dimension in the Z-component direction. If actual Z-component data is available, the FE layer 101 can make a third request for the Z-component data associated with the series identifier and stitch the received data together with the X-component data and the Y-component data for rendering by the user interface generator 118 of FIG. 1. The embodiment of FIG. 2B implements another approach to data storage that is not necessarily based on the big data-key value store model. With the configuration of FIG. 2B, multiple values are stored together for a single series. When the FE layer 101 makes a request to the BE layer 201b to get 3D data, the FE layer 101 can make one request and receive the X-component data and the Y-component data (and any other data) associated with a series identifier. Subsequent data stitching is not required.

With regard to the embodiments of FIG. 1 implemented either with FIG. 2A or FIG. 2B, a series type is preferably associated with the data sent to user interface generator 118. The series type can, for example, indicate that the data is associated with three or more dimensions of data or with two or fewer dimensions of data. The series type can further indicate the preferred mode for displaying data. For instance, for data in three or more dimensions, the series type can indicate whether the data should be represented as a pseudo-cone, -cylinder, -sphere, -cube, -torus, or another appropriate shape. In such embodiments, the interface generator 118 can read the series type and determine the correct chart type for rendering and/or displaying the data.

Displaying a Pseudo-3D Object With Associated Metadata

At least one embodiment includes a computer-implemented system. The system can include components for storing multiple data series, as discussed with respect to FIGS. 1, 2A, and 2B. The following discussion also refers to FIGS. 3A-3G.

The components of the computer-implemented system can include a database, as described above. For purposes of discussion here, the term "data series database" is implemented here. The system can also include one or more non-transitory computer storage media for storing metadata associated with the data series. Suitable non-transitory computer storage media can include hard drives, as described above. The system can include one or more hardware computer processors programmed with executable code instructions to implement one or more services. Suitable hardware computer processors are embodied in servers and/or computers, as described above.

Figure 3A:
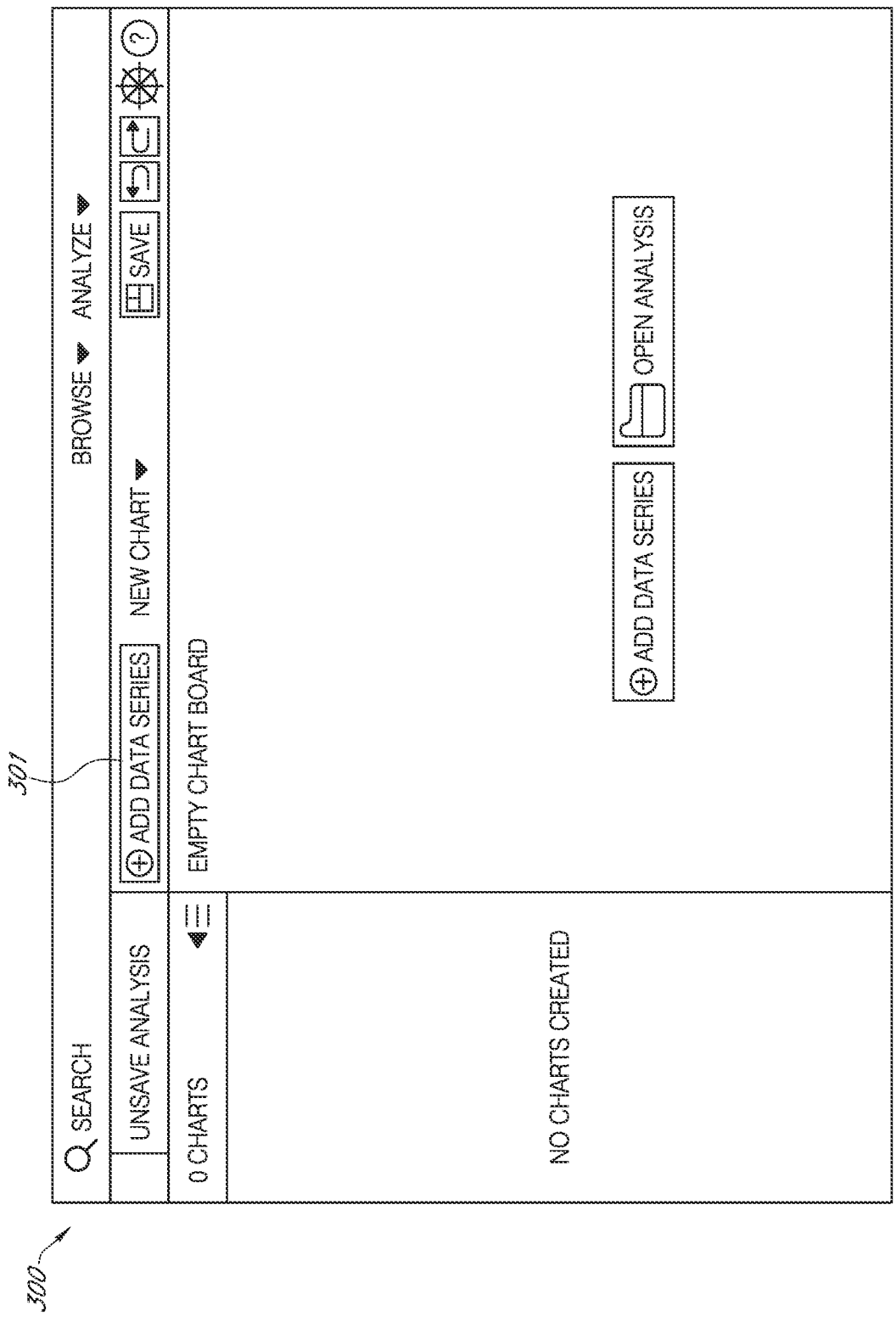
FIGS. 3A-3G are schematic representations of interactive user interfaces generated by one or more components of a computing system according to at least one embodiment.
Figure 3B:
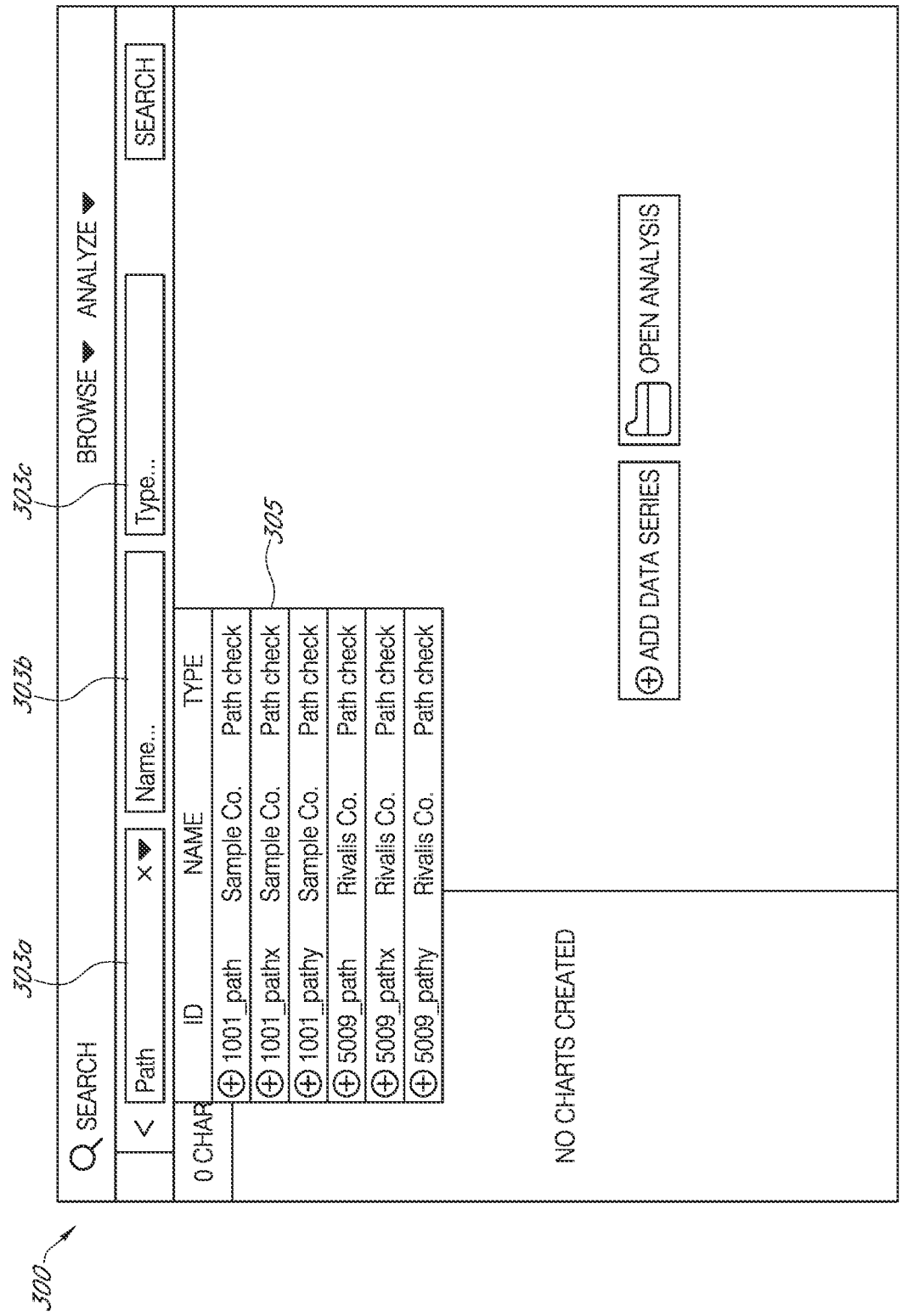

The services implemented by the executable code instructions of the one or more hardware computer processors include receiving a data series request comprising a data series indicator. An example data series indicator may be a textual and/or numerical identifier for a machine or physical structure with associated sensor or other series data. FIG. 3A shows an example user interface 300 generated by user interface generator 118 of FIG. 1. The user can interact with selection field 301 to initiate a data series request. FIG. 3B shows another aspect of the example user interface 300 shown in FIG. 3A after the interaction. In FIG. 3B, the user interface 300 changes to show a data entry fields 303a-303c. In this example, a user enters text "path" into data entry field 303a, which triggers the user interface 300 to populate selection menu 305 with entries related to the text. The user can use a mouse input device to click on the entry "1001_path" to make a selection, which causes the one or more hardware computer processors to receive a data series request comprising a data series indicator related to the selected entry.

The services further include retrieving from the data series database one or more data series from the plurality of data series, based on the data series indicator. For example, data stored in the storage of BE layer 201a or 201b can be retrieved based on the association with the data series indicator. In the embodiment of FIG. 2A, for instance, a database primary key can be associated with the data series indicator.

The services further include retrieving, from the metadata on the non-transitory computer storage medium, first metadata associated with the one or more data series. Continuing the prior example, when a user selects an alphanumeric string associated with a physical structure with associated size data, the metadata could include temperatures or pressures associated with various spatial positions.

Figure 3C:
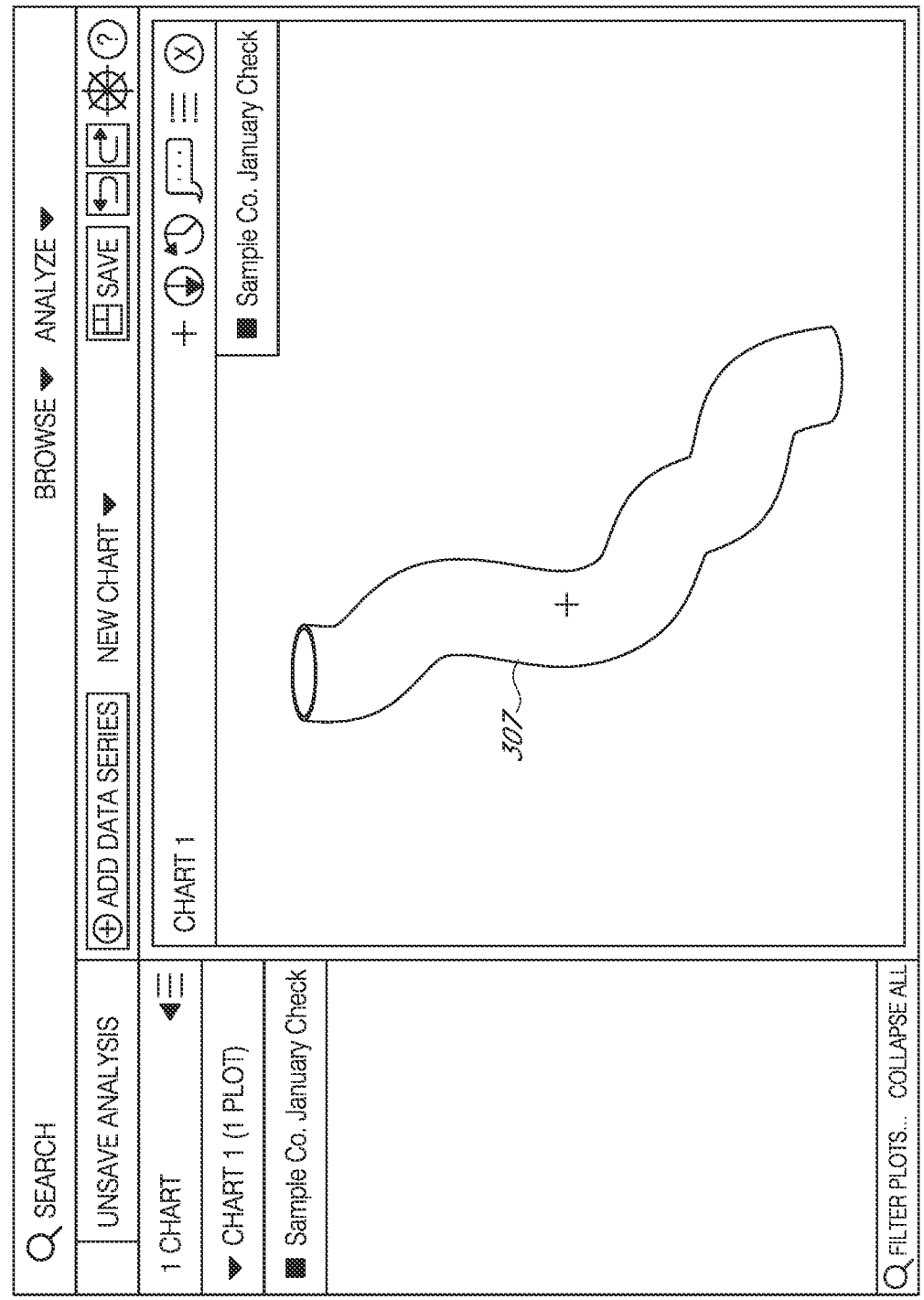

The services further include determining a series type associated with the retrieved one or more data series, as discussed above. Based on a determination that the series type is associated with three-or-higher-order dimensional data, the services can render at least some data of the one or more data series to allow for display of a pseudo-3D object indicative of the one or more data series on a computer display. In the example of FIG. 3C, the services rendered the data to allow for display of a pseudo-3D object 307, here a protruded spline or pipe shape. FIG. 3C shows a display on a two-dimensional medium, such as a computer monitor. The displayed image is not truly 3D, because the viewing user can only view two dimensions on a 2D display. But the viewer can perceive the object as representing three-dimensional data, even though it is displayed in two dimensions, because of differences in, for example, shading.

Once displayed, a user with a user device can manipulate the visualization by, for example, zooming and rotating the pseudo-3D object 307. A user can also interact with the visualization by viewing metadata associated with various data points. The system provides a rich experience to understand multi-dimensional data.

In this regard, the services can also include receiving a user input associated with the displayed pseudo-3D object 307. Programming can be custom associated with certain user input events. For example, the user can click on the user interface using a mouse-type user input device and drag the mouse to the left or right, up or down, and the system will receive associated click and drag user inputs. The system can be programmed to make appropriate changes to the user interface 300, such as rotation, skewing, moving, etc. As another example, the user can touch the display screen or hover a finger over a point on the shape displayed on the user interface after rendering, and the system will receive associated click or hover user inputs and make desired changes to the display, such as display of metadata, as discussed below.

Figure 3D:
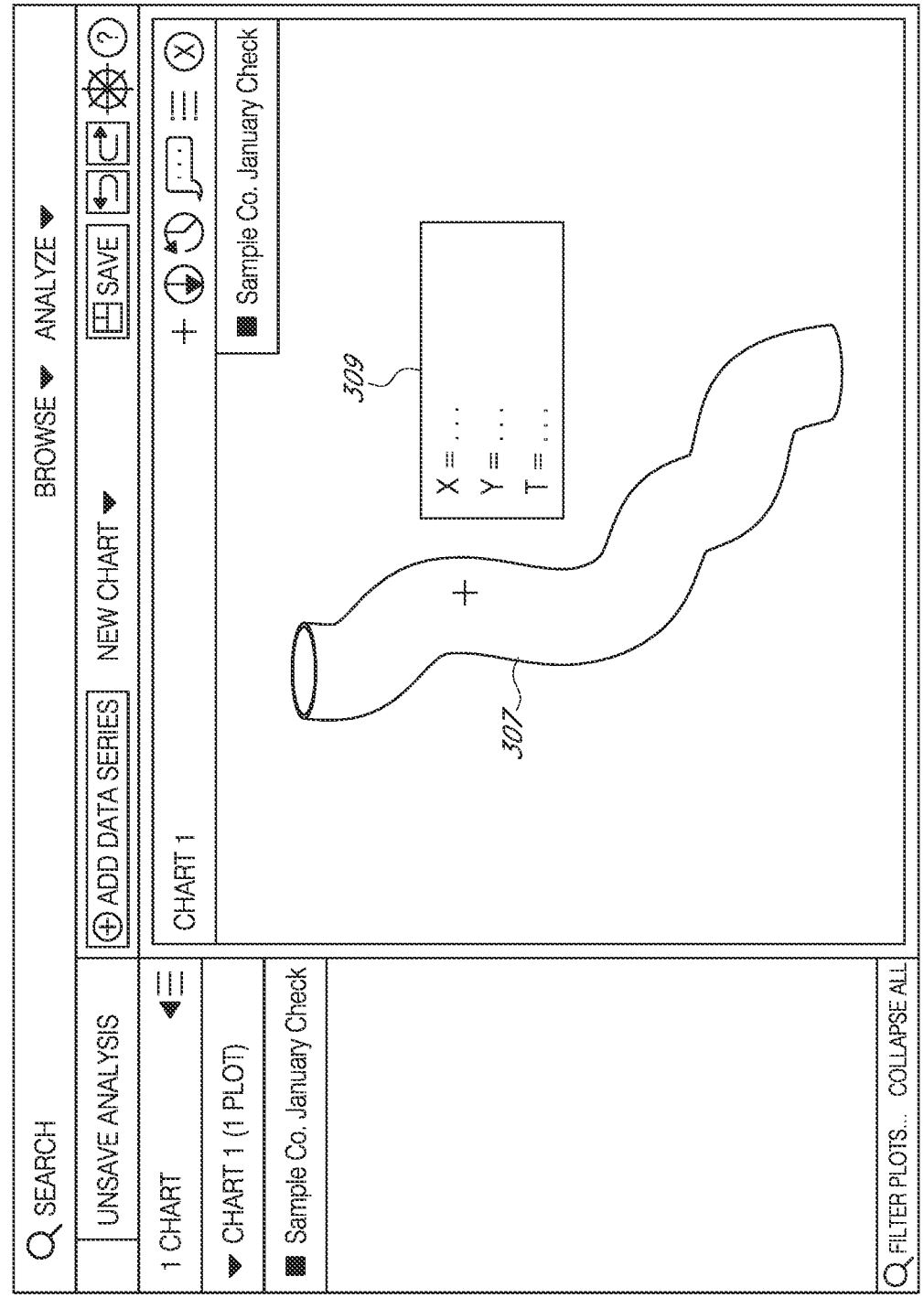

The services can further include selecting content associated with the user input from the retrieved first metadata and format the selected content to allow for display on the computer display of graphical information indicative of the content, concurrently with the pseudo-3D object. For example, in response to the touch or hover events discussed in the prior paragraph, the system can determine a temperature or pressure associated with a spatial position on the object 307 from the metadata. Then, as shown in FIG. 3D, the system can present a text box 309 displaying the associated temperature (as shown) or pressure (not shown) near that spatial position or at another area of the user display. The text box 309 here also shows the raw spatial data with the temperature metadata.

Figure 3E:
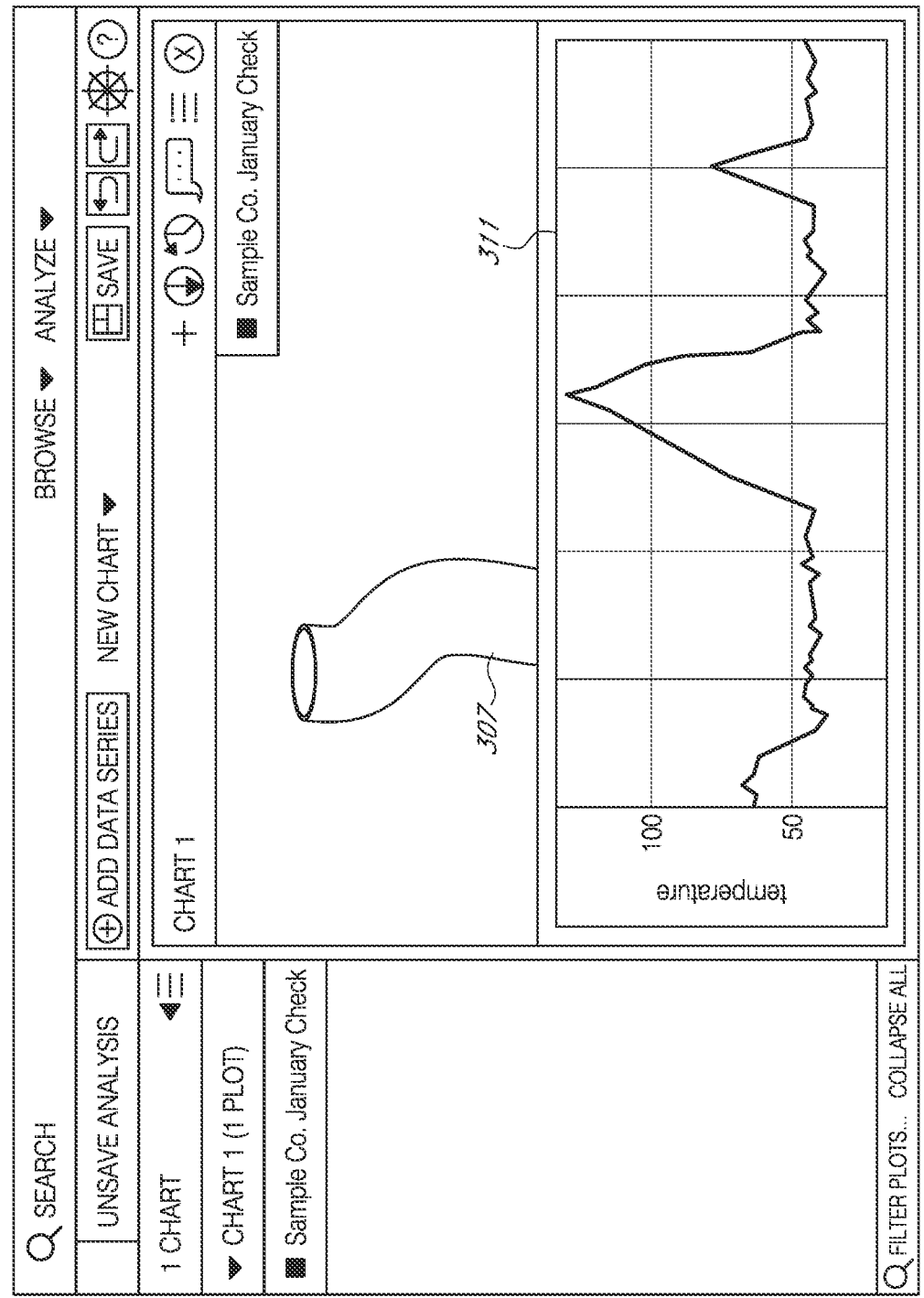

Another example is shown in FIG. 3E. In this example, the pseudo-3D object 307 is displayed adjacent a two-dimensional plot 311. In this example, the two-dimensional plot 311 shows high temperature readings, derived from the metadata, as a function of time. In an embodiment, the user can select a temperature reading from the two-dimensional plot 311 and the pseudo-3D object 307 will update in response to the selection. For example, when a user selects a certain high temperature from the two-dimensional plot 311, the pseudo-3D object 311 can update to show where on the object the associated temperature occurred. Conversely, the two-dimensional plot 311 can update based on a selection on the pseudo-3D object 307. For example, a user can select a spatial position on the pseudo-3D object 307, and the temperatures at that position over time can be displayed as a two-dimensional plot 311 next to, under, or over the pseudo-3D object 307, as appropriate. In some embodiments, the positions can be configurable by the user, in response to a drag and drop event, for example.

In some embodiments, the user interface can be used to receive user input about a displayed pseudo-3D object and update the data stored in the BE layer 201a or BE layer 201b based on the user input. For example, a user can enter an annotation regarding spatial data (to add metadata or correct existing data, for example) and the metadata or data can be updated to receive the annotation.

Figure 3F:
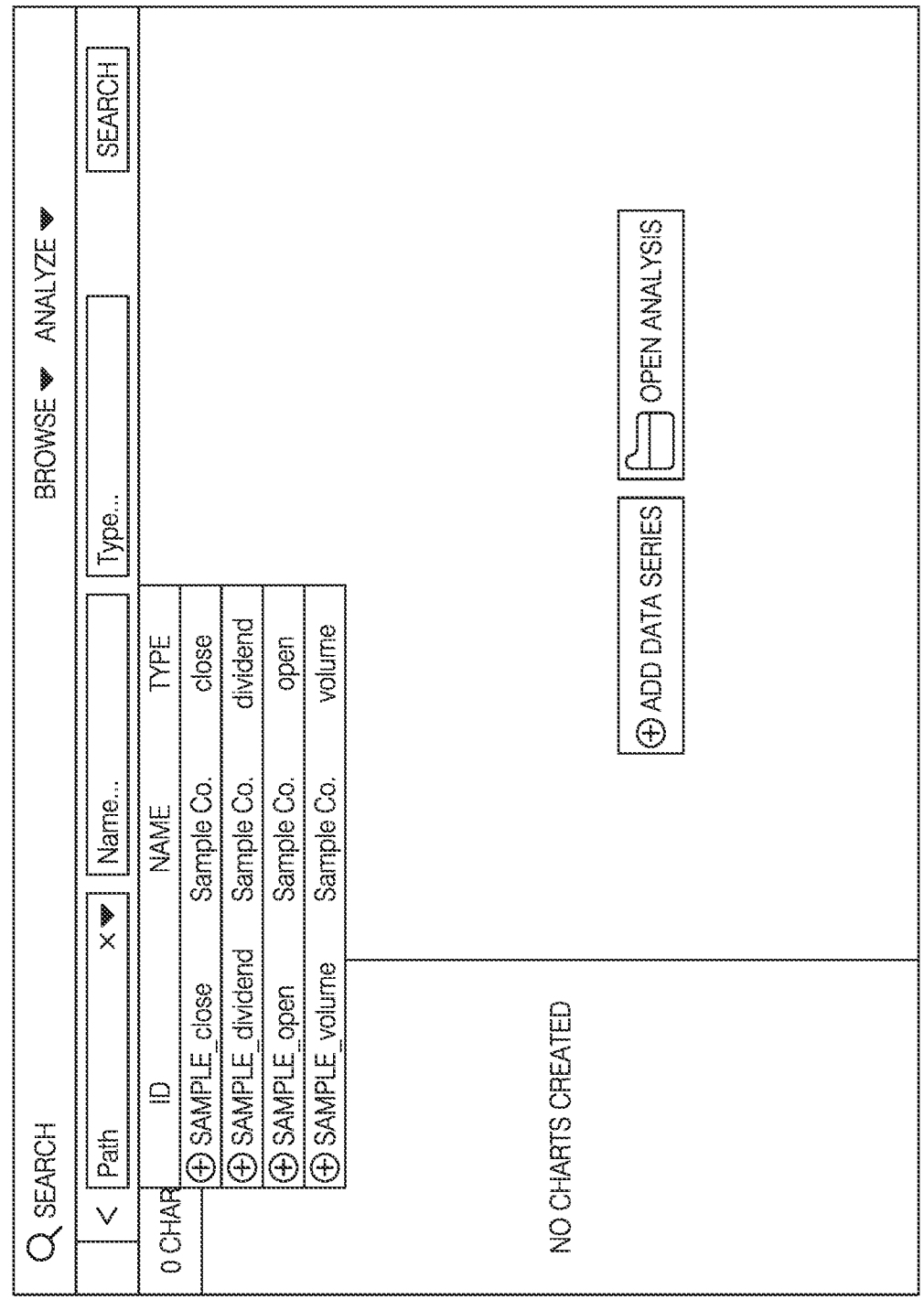
Figure 3G:
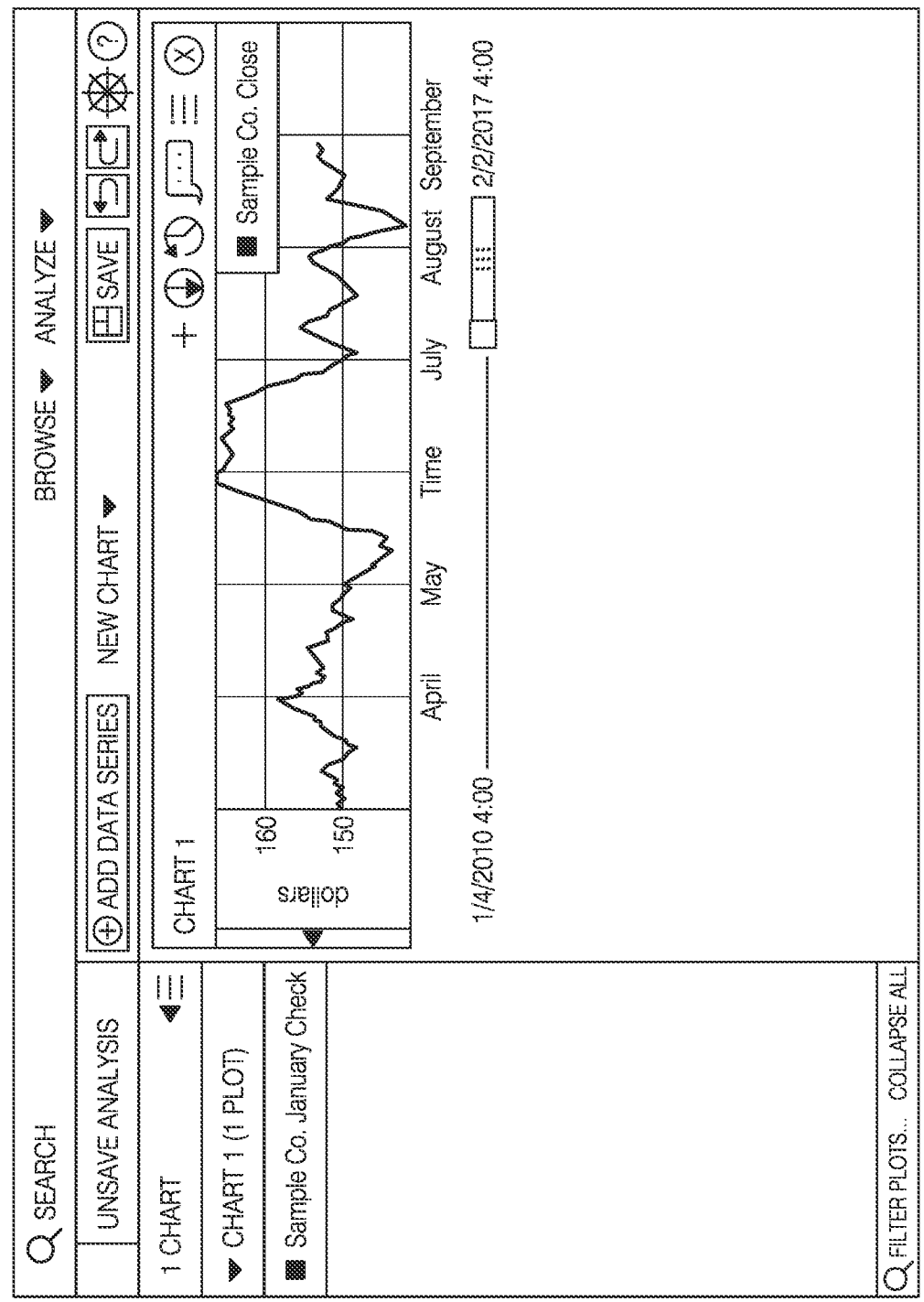

Furthermore, it should be understood that the pseudo-3D object is not limited to display in three dimensions. Display in more than three dimensions is contemplated. Additional dimensions (such as time, temperature, etc.) can be added to show flow of a material through the positional space shown in FIG. 3B. Such dimensions can be represented as changes in color and/or shape in animations, for instance. In addition, display in fewer than two dimensions is contemplated, as shown in FIGS. 3F and 3G, which show selection (FIG. 3F) and display (FIG. 3G) of two-dimensional data relating to stock prices over time.

Adding Layers to a Displayed Object

In some implementations, the system 100 of FIGS. 1, 2A, and 2B can be configured to add layers to a displayed object or displayed objects, changing the object from one displayed in fewer than three dimensions to one displayed as a pseudo-3D object. In this regard, the system can be configured to receive a first user input related to a first series type associated with less than three dimensional data, and based on the first user input, process at least some data of the multiple data series to allow for display of a first object on a computer display, receive a second user input related to a second series type associated with three or more dimensional data, and based on the second user input, render at least some data of the multiple data series, including the at least some data of the multiple data series processed based on the first user input, to allow for display of a second object on the computer display, the second object being pseudo-3D, receive a user input associated with the displayed first object or the displayed second object, and select content associated with the user input from the retrieved first metadata and format the selected content to allow for display on the computer display of graphical information indicative of the content, concurrently with the first object or the second object.

As a user adds layers of data, the display changes. The second object can be displayed in place of the first object. For example, a pseudo-3D object can replace a 2D graph on the display. Or the pseudo-3D object can be displayed with the 2D graph. A 2D graph can be displayed alongside a pseudo-3D object. As discussed above, the display is not limited to three-dimensional data.

Additional Implementation Details and Embodiments

Various embodiments of the present disclosure may be a system, a method, and/or a computer program product at any possible technical detail level of integration. The computer program product may include a computer readable storage medium (or mediums) having computer readable program instructions thereon for causing a processor to carry out aspects of the present disclosure.

For example, the functionality described herein may be performed as software instructions are executed by, and/or in response to software instructions being executed by, one or more hardware processors and/or any other suitable computing devices. The software instructions and/or other executable code may be read from a computer readable storage medium (or mediums).

The computer readable storage medium can be a tangible device that can retain and store data and/or instructions for use by an instruction execution device. The computer readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions (as also referred to herein as, for example, "code," "instructions," "module," "application," "software application," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. Computer readable program instructions may be callable from other instructions or from itself, and/or may be invoked in response to detected events or interrupts. Computer readable program instructions configured for execution on computing devices may be provided on a computer readable storage medium, and/or as a digital download (and may be originally stored in a compressed or installable format that requires installation, decompression or decryption prior to execution) that may then be stored on a computer readable storage medium. Such computer readable program instructions may be stored, partially or fully, on a memory device (e.g., a computer readable storage medium) of the executing computing device, for execution by the computing device. The computer readable program instructions may execute entirely on a user's computer (e.g., the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart(s) and/or block diagram(s) block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid state drive) either before or after execution by the computer processor.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted in some implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, etc. with custom programming/execution of software instructions to accomplish the techniques).

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above-embodiments may generally (but not necessarily) be controlled and/or coordinated by operating system software, such as Mac OS, iOS, Android, Chrome OS, Windows OS (e.g., Windows XP, Windows Vista, Windows 7, Windows 8, Windows 10, Windows Server, etc.), Windows CE, Unix, Linux, SunOS, Solaris, Blackberry OS, VxWorks, or other suitable operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 4:
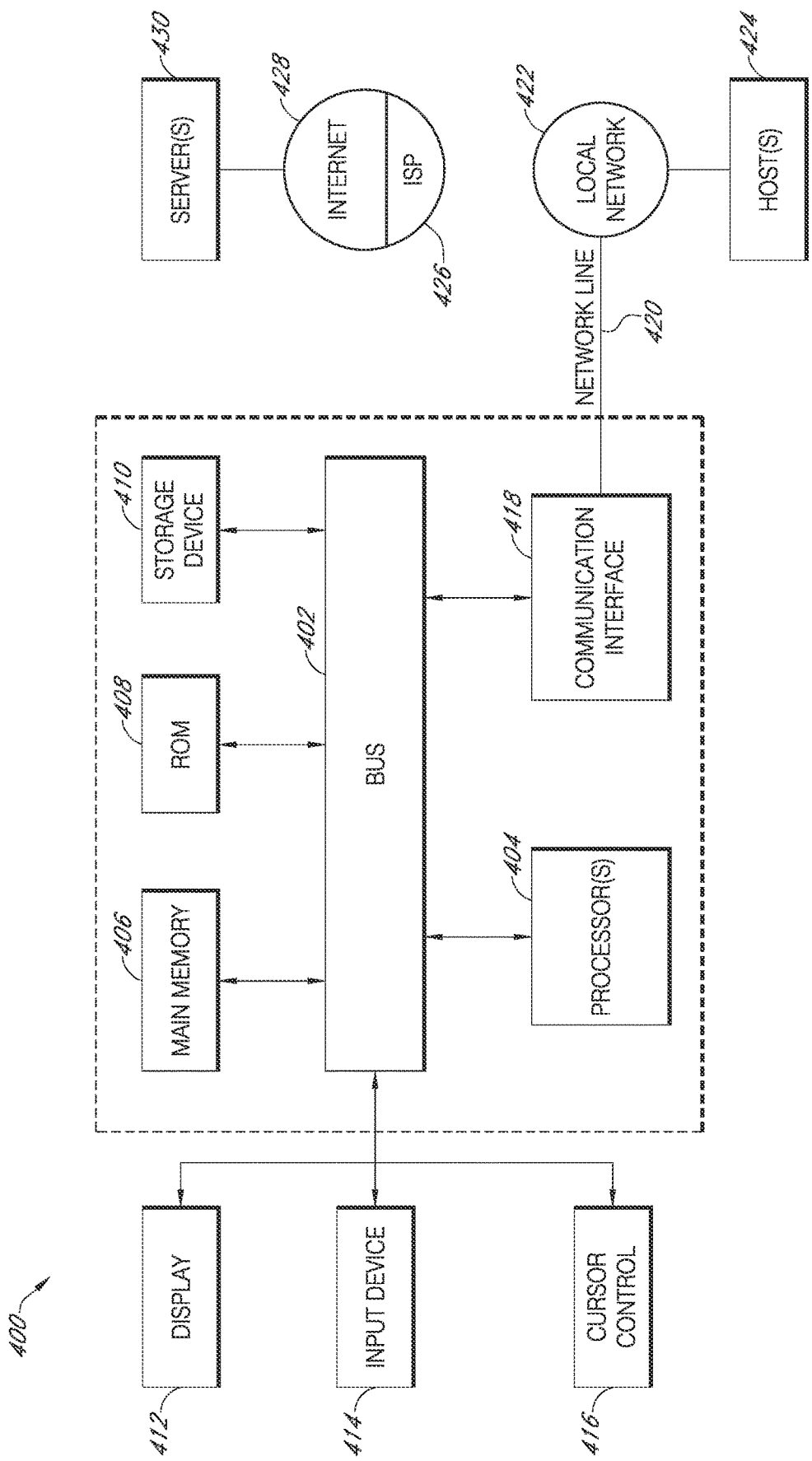
FIG. 4 illustrates a computer system with which certain methods discussed herein may be implemented, according to one or more embodiments.

For example, FIG. 4 is a block diagram that illustrates a computer system 400 upon which various embodiments may be implemented. Computer system 400 includes a bus 402 or other communication mechanism for communicating information, and a hardware processor, or multiple processors, 404 coupled with bus 402 for processing information. Hardware processor(s) 404 may be, for example, one or more general purpose microprocessors.

Computer system 400 also includes a main memory 406, such as a random access memory (RAM), cache and/or other dynamic storage devices, coupled to bus 402 for storing information and instructions to be executed by processor 404. Main memory 406 also may be used for storing temporary variables or other intermediate information during execution of instructions to be executed by processor 404. Such instructions, when stored in storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or USB thumb drive (Flash drive), etc., is provided and coupled to bus 402 for storing information and instructions.

Computer system 400 may be coupled via bus 402 to a display 412, such as a cathode ray tube (CRT) or LCD display (or touch screen), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

Computing system 400 may include a user interface module to implement a GUI that may be stored in a mass storage device as computer executable program instructions that are executed by the computing device(s). Computer system 400 may further, as described below, implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor(s) 404 executing one or more sequences of one or more computer readable program instructions contained in main memory 406. Such instructions may be read into main memory 406 from another storage medium, such as storage device 410. Execution of the sequences of instructions contained in main memory 406 causes processor(s) 404 to perform the process steps described herein. In alternative embodiments, hard-wired circuitry may be used in place of or in combination with software instructions.

Various forms of computer readable storage media may be involved in carrying one or more sequences of one or more computer readable program instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN (or WAN component to communicated with a WAN). Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 830 might transmit a requested code for an application program through Internet 428, ISP 426, local network 422 and communication interface 418.

The received code may be executed by processor 404 as it is received, and/or stored in storage device 410, or other non-volatile storage for later execution.

As described above, in various embodiments certain functionality may be accessible by a user through a web-based viewer (such as a web browser), or other suitable software program). In such implementations, the user interface may be generated by a server computing system and transmitted to a web browser of the user (e.g., running on the user's computing system). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may then interact with the user interface through the web-browser. User interfaces of certain implementations may be accessible through one or more dedicated software applications. In certain embodiments, one or more of the computing devices and/or systems of the disclosure may include mobile computing devices, and user interfaces may be accessible through such mobile computing devices (for example, smartphones and/or tablets).

Many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "substantially" when used in conjunction with the term "real-time" forms a phrase that will be readily understood by a person of ordinary skill in the art. For example, it is readily understood that such language will include speeds in which no or little delay or waiting is discernible, or where such delay is sufficiently short so as not to be disruptive, irritating, or otherwise vexing to a user.

Conjunctive language such as the phrase "at least one of X, Y, and Z," or "at least one of X, Y, or Z," unless specifically stated otherwise, is to be understood with the context as used in general to convey that an item, term, etc. may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain embodiments require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

Finally, it should be noted that the purpose of the attached abstract is to enable the U.S. Patent and Trademark Office and the public generally, and especially the scientists, engineers, and practitioners in the art who are not familiar with patent or legal terms or phraseology, to determine quickly from a cursory inspection the nature and essence of the technical disclosure. The abstract is not intended to be limiting as to the scope of the invention in any way.

While the above detailed description has shown, described, and pointed out novel features as applied to various embodiments, it may be understood that various omissions, substitutions, and changes in the form and details of the devices or processes illustrated may be made without departing from the spirit of the disclosure. As may be recognized, certain embodiments of the inventions described herein may be embodied within a form that does not provide all of the features and benefits set forth herein, as some features may be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A system comprising:
    one or more hardware computer processors programmed, via executable code instructions, to implement a data series service configured to
        receive a data series request comprising a data series indicator associated with a physical structure, wherein the physical structure is associated with one or more sensors;
        access one or more data series of a plurality of data series, based on the data series indicator and associated with the one or more sensors;
        determine a series type associated with the accessed one or more data series;
        render at least some data of the one or more data series to allow for display of a pseudo-three-dimensional representation of at least a portion of the physical structure on a computer display;
        receive at least one first user input associated with the displayed pseudo-three-dimensional representation; and
        display, on the computer display, content associated with the first user input.

2. The system of claim 1, wherein the first user input comprises gesture data.

3. The system of claim 1, wherein the content associated with the first user input comprises an annotation.

4. The system of claim 3, wherein the data series service is further configured to:
    display the annotation superimposed on the pseudo-three-dimensional representation.

5. The system of claim 3, wherein the data series service is further configured to:
    display the annotation adjacent to the pseudo-three-dimensional representation.

6. The system of claim 5, wherein the content associated with the first user input comprises a less-than-three-dimensional object, and the data series service is configured to format the content to allow for display of the less-than-three dimensional object adjacent to the pseudo-three-dimensional representation.

7. The system of claim 6, wherein the data series service is further configured to receive a second user input associated with the less-than-three-dimensional object and, based on the second user input, allow for a change in the display of the pseudo-three-dimensional representation.

8. The system of claim 6, wherein the data series service is further configured to allow for a change in the display of the less-than-three dimensional object based on the at least one first user input.

9. The system of claim 1, wherein a subset of data from the one or more data series is rendered to allow for display of the pseudo-three-dimensional representation on the computer display.

10. The system of claim 1, wherein all data from the retrieved one or more data series is rendered to allow for display of the pseudo-three-dimensional representation on the computer display.

11. A computerized method, performed by a computing system having one or more hardware computer processors and one or more non-transitory computer readable storage device storing software instructions executable by the computing system to perform the computerized method comprising:
    receiving a data series request comprising a data series indicator associated with a physical structure, wherein the physical structure is associated with one or more sensors;
    accessing one or more data series of a plurality of data series, based on the data series indicator and associated with the one or more sensors;
    determining a series type associated with the accessed one or more data series;
    rendering at least some data of the one or more data series to allow for display of a pseudo-three-dimensional representation of at least a portion of the physical structure on a computer display;
    receiving at least one first user input associated with the displayed pseudo-three-dimensional representation; and
    displaying content associated with the first user input.

12. The method of claim 11, wherein the first user input comprises gesture data.

13. The method of claim 11, wherein the content associated with the first user input comprises an annotation.

14. The method of claim 13, further comprising:
    displaying the annotation superimposed on the pseudo-three-dimensional representation.

15. The method of claim 13, further comprising:
    displaying the annotation adjacent to the pseudo-three-dimensional representation.

16. The method of claim 15, wherein the content associated with the first user input comprises a less-than-three-dimensional object, the method further comprising:
    formatting the content to allow for display of the less-than-three dimensional object adjacent to the pseudo-three-dimensional representation.

17. The method of claim 16, further comprising:
    receiving a second user input associated with the less-than-three-dimensional object and,
    based on the second user input, allowing for a change in the display of the pseudo-three-dimensional representation.

18. The method of claim 16, further comprising:
    allowing for a change in the display of the less-than-three dimensional object based on the at least one first user input.

19. The method of claim 11, wherein a subset of data from the one or more data series is rendered to allow for display of the pseudo-three-dimensional representation on the computer display.

20. The method of claim 11, wherein all data from the retrieved one or more data series is rendered to allow for display of the pseudo-three-dimensional representation on the computer display.

* * * * *